(12) United States Patent
Makino et al.

(10) Patent No.: US 9,709,310 B2
(45) Date of Patent: Jul. 18, 2017

(54) AIR CONDITIONING APPARATUS

(71) Applicant: DAIKIN INDUSTRIES, LTD., Osaka-shi, Osaka (JP)

(72) Inventors: Tatsuya Makino, Sakai (JP); Yoshiaki Yumoto, Sakai (JP); Shouhei Miyatani, Sakai (JP); Tsuyoshi Yamada, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/031,942

(22) PCT Filed: Sep. 10, 2014

(86) PCT No.: PCT/JP2014/073953
§ 371 (c)(1),
(2) Date: Apr. 25, 2016

(87) PCT Pub. No.: WO2015/064221
PCT Pub. Date: May 7, 2015

(65) Prior Publication Data
US 2016/0273817 A1   Sep. 22, 2016

(30) Foreign Application Priority Data

Oct. 29, 2013   (JP) ................................. 2013-224519

(51) Int. Cl.
*F25B 49/02*   (2006.01)
*F25B 13/00*   (2006.01)
(Continued)

(52) U.S. Cl.
CPC ............ *F25B 49/022* (2013.01); *F25B 13/00* (2013.01); *F25B 39/00* (2013.01); *F25B 47/025* (2013.01);
(Continued)

(58) Field of Classification Search
CPC ...... F25B 49/022; F25B 47/025; F25B 39/00; F25B 39/028; F25B 2600/0253; F28F 9/0275; F28D 1/05375
See application file for complete search history.

(56) References Cited

U.S. PATENT DOCUMENTS 2,847,190 A * 8/1958 Slattery .................. F25B 13/00
165/233
3,132,490 A * 5/1964 Schmidt .................. F25B 13/00
62/155
(Continued)

FOREIGN PATENT DOCUMENTS

JP   S61-59158 A   3/1986
JP   6-221645 A   8/1994
(Continued)

OTHER PUBLICATIONS

International Preliminary Report of corresponding PCT Application No. PCT/JP2014/073953 dated May 12, 2016.
(Continued)

*Primary Examiner* — Jianying Atkisson
*Assistant Examiner* — Kun Kai Ma
(74) *Attorney, Agent, or Firm* — Global IP Counselors, LLP (57) ABSTRACT

An air conditioning apparatus includes a refrigerant circuit performing an air-warming operation by circulating refrigerant through the compressor, indoor heat exchanger, expansion valve, and outdoor heat exchanger in order. The outdoor heat exchanger has flat perforated tubes arrayed vertically in multiple levels. The heat transfer tubes are sectioned into main and subordinate heat exchange parts. Upper and lower exit-entry spaces are formed in the outdoor heat exchanger. When an oil-accumulation-resolving criterion is met during the air-warming operation, low-refrigerant-circulation control, in which the refrigerant is circulated through the
(Continued)

compressor, indoor heat exchanger, expansion valve, and outdoor heat exchanger in order, is performed for a predetermined time with an operating capacity of the compressor having been lowered to a predetermined capacity. The oil-accumulation resolving criterion is used to initiate an operation of defrosting the outdoor heat exchanger after the low-refrigerant-circulation control is performed.

5 Claims, 8 Drawing Sheets

(51) Int. Cl.
    *F25B 47/02* (2006.01)
    *F28F 1/22* (2006.01)
    *F25B 39/00* (2006.01)
    *F28F 9/02* (2006.01)
    *F28D 1/053* (2006.01)
    *F28F 1/12* (2006.01)
    *F25B 39/02* (2006.01)

(52) U.S. Cl.
    CPC .......... *F28D 1/05391* (2013.01); *F28F 1/126* (2013.01); *F28F 1/22* (2013.01); *F28F 9/027* (2013.01); *F25B 39/028* (2013.01); *F25B 2600/0253* (2013.01); *F25B 2600/111* (2013.01); *F28F 2215/12* (2013.01); *F28F 2250/06* (2013.01)

(56) References Cited

U.S. PATENT DOCUMENTS

| | | | | |
|---|---|---|---|---|
| 4,882,908 A * | 11/1989 | White | ............... | F25B 13/00 165/233 |
| 5,095,711 A * | 3/1992 | Marris | ............... | F25B 47/025 62/156 |
| 5,203,407 A * | 4/1993 | Nagasaka | ............... | F28D 1/05375 165/174 |
| 5,285,646 A * | 2/1994 | TaeDuk | ............... | F25B 13/00 62/115 |
| 5,752,566 A * | 5/1998 | Liu | ............... | F25B 39/04 165/110 |
| 5,988,267 A * | 11/1999 | Park | ............... | F25B 39/04 165/110 |
| 6,012,294 A * | 1/2000 | Utsumi | ............... | F25B 47/022 62/156 |
| 6,382,310 B1 * | 5/2002 | Smith | ............... | F28F 9/26 165/121 |
| 6,769,269 B2 * | 8/2004 | Oh | ............... | F25B 39/04 62/507 |
| 2005/0257558 A1 * | 11/2005 | Yoshioka | ............... | B82Y 30/00 62/324.5 |
| 2005/0268628 A1 | 12/2005 | Thompson | | |
| 2006/0230770 A1 * | 10/2006 | Kitsch | ............... | F25B 13/00 62/151 |
| 2007/0074523 A1 * | 4/2007 | Takegami | ............... | F25B 13/00 62/151 |
| 2008/0190131 A1 * | 8/2008 | Giallombardo | ............... | F24F 1/48 62/324.5 |
| 2008/0308264 A1 * | 12/2008 | Antonijevic | ............... | F28D 1/05375 165/165 |
| 2010/0089095 A1 * | 4/2010 | Macri | ............... | F25B 39/028 62/525 |
| 2011/0100041 A1 * | 5/2011 | Crawford | ............... | F25B 13/00 62/156 |
| 2012/0055185 A1 * | 3/2012 | Luo | ............... | F25B 6/02 62/222 |
| 2012/0067070 A1 * | 3/2012 | Albertson | ............... | F25B 13/00 62/126 |
| 2013/0306285 A1 | 11/2013 | Jindou et al. | | |
| 2014/0026601 A1 * | 1/2014 | Chen | ............... | F25B 47/025 62/81 |

FOREIGN PATENT DOCUMENTS

| | | |
|---|---|---|
| JP | 8-226716 A | 9/1996 |
| JP | 2010-163328 A | 8/2012 |

OTHER PUBLICATIONS

International Search Report of corresponding PCT Application No. PCT/JP2014/073953 dated Dec. 2, 2014.
European Search Report of corresponding EP Application No. 14 85 9221.5 dated Jun. 1, 2017.

\* cited by examiner

AIR CONDITIONING APPARATUS

CROSS-REFERENCE TO RELATED APPLICATIONS

This U.S. National stage application claims priority under 35 U.S.C. §119(a) to Japanese Patent Application No. 2013-224519, filed in Japan on Oct. 29, 2013, the entire contents of which are hereby incorporated herein by reference.

TECHNICAL HELD

The present invent on relates to an air conditioning apparatus, and particularly relates to an air conditioning apparatus having an outdoor heat exchanger or an indoor heat exchanger composed of a heat exchanger in which flat perforated tubes are used as heat transfer tubes.

BACKGROUND ART

In conventional practice, there have been air conditioning apparatuses which have an outdoor heat exchanger composed of a heat exchanger in which flat perforated tubes are used as heat transfer tubes, and which perform an air-warming operation, as shown in Japanese Laid-open Patent Application No. 2012-163328. Specifically, such an air conditioning apparatus has a refrigerant circuit configured by connecting a compressor, an outdoor heat exchanger composed of a heat exchanger in which flat perforated tubes are used as heat transfer tubes, an expansion valve, and an indoor heat exchanger. Such an air conditioning apparatus is designed to perform an air-warming operation for warming air in a room by causing refrigerant to circulate through the compressor, the indoor heat exchanger, the expansion valve, and the outdoor heat exchanger in the stated order.

SUMMARY

In the above-described conventional air conditioning apparatus having an outdoor heat exchanger composed of a heat exchanger in which flat perforated tubes are used as heat transfer tubes, refrigerant drifts in the outdoor heat exchanger during the air-warming operation which causes the refrigerant flow rate to decrease in the heat transfer tubes composed of flat perforated tubes constituting the outdoor heat exchanger, and refrigerating oil tends to readily accumulate in the heat transfer tubes because the refrigerant flow channels in the heat transfer tubes are small. The refrigerating oil becomes sealed within the refrigerant circuit together with the refrigerant in order to lubricate the compressor. When refrigerating oil accumulates in the heat transfer tubes in this manner and, e.g., a defrosting operation is performed to defrost the outdoor heat exchanger, refrigerant does not readily flow to the heat transfer tubes where refrigerating oil has accumulated, due to increased flow channel resistance in the heat transfer tubes caused by the accumulated refrigerating oil. This causes a risk that frost will melt and remain on the outer surfaces of the heat transfer tubes where refrigerating oil has accumulated, and that the outdoor heat exchanger will be inadequately defrosted.

Even when the apparatus configuration has an indoor heat exchanger composed of a heat exchanger in which flat perforated tubes are used as heat transfer tubes, refrigerant drifts in the indoor heat exchanger during the air-cooling operation which causes the refrigerant flow rate to decrease in the heat transfer tubes composed of flat perforated tubes constituting the indoor heat exchanger, and there is a risk that refrigerating oil will accumulate in the heat transfer tubes and that refrigerant will not readily flow to the heat transfer tubes where the refrigerating oil has accumulated.

An object of the present invention, in an air conditioning apparatus having an outdoor heat exchanger or an indoor heat exchanger composed of a heat exchanger in which flat perforated tubes are used as heat transfer tubes, is to solve the problem of refrigerating oil accumulation which occurs during the air-warming operation or the air-cooling operation in the heat transfer tubes constituting the outdoor heat exchanger or the indoor heat exchanger.

An air conditioning apparatus according to a first aspect has a refrigerant circuit configured by connecting a compressor, an outdoor heat exchanger, an expansion valve, and an indoor heat exchanger, and the air conditioning apparatus performs an air-warming operation for warming air in a room by circulating refrigerant through the compressor, the indoor heat exchanger, the expansion valve, and the outdoor heat exchanger in the stated order. The outdoor heat exchanger here is a heat exchanger in which flat perforated tubes are used as heat transfer tubes. When an oil-accumulation-resolving criterion is met during the air-warming operation, low-refrigerant-circulation control, in which refrigerant is circulated through the compressor, the indoor heat exchanger, the expansion valve, and the outdoor heat exchanger in the stated order, is performed by a controller of the air conditioning apparatus for a predetermined time with the operating capacity of the compressor having been lowered to a predetermined capacity.

As described above in the present aspect of the invention, when the oil-accumulation-resolving criterion is met during the air-warming operation, low-refrigerant-circulation control, in which refrigerant is circulated through the compressor, the indoor heat exchanger, the expansion valve, and the outdoor heat exchanger in the stated order, is performed for a predetermined time with the operating capacity of the compressor having been lowered to a predetermined capacity.

Refrigerant then circulates within the refrigerant circuit in the same direction as the air-warming operation during low-refrigerant-circulation control, but due to the decrease in the operating capacity of the compressor, the state of refrigerant drift within the outdoor heat exchanger changes, and the refrigerant flow rate tends to increase in the heat transfer tubes where refrigerating oil has accumulated. Refrigerating oil that has accumulated in the heat transfer tubes is thereby expelled by the flow of refrigerant, and refrigerating oil accumulation in the heat transfer tubes can be resolved.

An air conditioning apparatus according to a second aspect is the air conditioning apparatus according to the first aspect, wherein the outdoor heat exchanger has the heat transfer tubes composed of flat perforated tubes arrayed vertically in a plurality of levels, and a first header collecting pipe and a second header collecting pipe to which the ends of the heat transfer tubes are connected. The heat transfer tubes are sectioned into a plurality of main heat exchange parts constituting the top part of the outdoor heat exchanger, and a plurality of subordinate heat exchange parts constituting the bottom part of the outdoor heat exchanger. An upper exit-entry space for gas refrigerant corresponding to the main heat exchange parts and a lower exit-entry space for liquid refrigerant corresponding to the subordinate heat exchange parts are formed in the first header collecting pipe by partitioning the internal space thereof from top to bottom. The forming of upper turn-back spaces corresponding to the main heat exchange parts and the forming of lower turn-back spaces corresponding to the subordinate heat exchange parts is accomplished of the second header collecting pipe by partitioning the internal space thereof from top to bottom, excluding the main heat exchange part and the subordinate heat exchange part that, of the plurality of main heat exchange parts and the plurality of subordinate heat exchange parts, are those that are vertically adjacent. The upper turn-back spaces and the lower turn-back spaces are connected via communication pipes, and the vertically adjacent main heat exchange part and subordinate heat exchange part are connected by a single shared turn-back space.

As described above in the present aspect of the invention, the outdoor heat exchanger has a structure sectioned into a plurality of main heat exchange parts constituting the top part and a plurality of subordinate heat exchange parts constituting the bottom part, the main heat exchange parts and the subordinate heat exchange parts being connected to each other through the turn-back spaces of the second header collecting pipe. Moreover, concerning the main heat exchange parts and subordinate heat exchange parts other than the vertically adjacent main heat exchange part and subordinate heat exchange part, the corresponding turn-back spaces are connected via communication pipes, and the vertically adjacent main heat exchange part and subordinate heat exchange part are connected by a single shared turn-back space (i.e., not via communication pipes). In this type of structure, during the air-warming operation, liquid refrigerant is sent from the subordinate heat exchange parts through the turn-back spaces of the second header collecting pipe to the main heat exchange parts where the refrigerant evaporates, but at this time, in the vertically adjacent main heat exchange part and subordinate heat exchange part connected by the single shared turn-back space, refrigerant readily drifts such that the refrigerant flow rate through the heat transfer tubes disposed in the bottom part of this main heat exchange part is less than the refrigerant flow rate through the heat transfer tubes disposed in the top part of this main heat exchange part. When refrigerant drifts in this manner, refrigerating oil accumulates in the heat transfer tubes that constitute the bottom part of the main heat exchange part vertically adjacent to and connected by the single shared turn-back space to the subordinate heat exchange part.

However, because low-refrigerant-circulation control such as is described above is performed in the present aspect of the invention, the state of refrigerant drift within the outdoor heat exchanger changes, and the refrigerant flow rate tends to increase in the heat transfer tubes constituting the bottom part of the main heat exchange part that is vertically adjacent and connected by the single shared turn-back space. Refrigerating oil accumulated in the heat transfer tubes constituting the main heat exchange part that is vertically adjacent to and connected by the single shared turn-back space to the subordinate heat exchange part is thereby expelled by the flow of refrigerant, and refrigerating oil accumulation in the heat transfer tubes can be resolved.

An air conditioning apparatus according to a third aspect is the air conditioning apparatus according to the first or second aspect, wherein the air conditioning apparatus further has an indoor fan, and the airflow volume of the indoor fan is reduced by the controller during low-refrigerant-circulation control.

During low-refrigerant-circulation control such as is described above, the high pressure in the refrigerant circuit (i.e., the condensation temperature of refrigerant in the indoor heat exchanger) readily decreases due to the decrease in the operating capacity of the compressor, the temperature of air supplied through the indoor heat exchanger into the room tends to decrease, and there is a risk that the comfort level in the room will be compromised.

In view of this, the airflow volume of the indoor fan is reduced during low-refrigerant-circulation control as described above in the present aspect of the invention.

In the present aspect of the invention, the decrease in the high pressure in the refrigerant circuit (i.e., the condensation temperature of refrigerant in the indoor heat exchanger) can thereby be suppressed during low-refrigerant-circulation control, and it is therefore possible to resolve the refrigerating oil accumulation in the heat transfer tubes constituting the outdoor heat exchanger that occurs during the air-warming operation while the comfort level in the room is ensured.

An air conditioning apparatus according to a fourth aspect is the air conditioning apparatus according to the third aspect, wherein the airflow volume of the indoor fan is reduced when the high pressure in the refrigerant circuit falls below a predetermined high pressure.

As described above in the present aspect of the invention, the airflow volume of the indoor fan is reduced by the controller when the high pressure in the refrigerant circuit falls below a predetermined high pressure.

In the present aspect of the invention, it is thereby possible to ensure the comfort level in the room while reducing the airflow volume of the indoor fan as little as possible during low-refrigerant-circulation control.

An air conditioning apparatus according to a fifth aspect is the air conditioning apparatus according to any of the first through fourth aspects, wherein the oil-accumulation-resolving criterion is a condition for initiating an operation of defrosting the outdoor heat exchanger, and the low-refrigerant-circulation control is performed by the controller before the operation of defrosting the outdoor heat exchanger is performed.

As described above in the present aspect of the invention, the oil-accumulation-resolving criterion is a criterion for initiating the operation of defrosting the outdoor heat exchanger, and the low-refrigerant-circulation control is performed before the operation of defrosting the outdoor heat exchanger is performed.

Doing so makes it possible for refrigerating oil accumulated in the heat transfer tubes during the air-warming operation to be expelled before the operation of defrosting the outdoor heat exchanger is performed, and refrigerant flows to any heat transfer tube constituting the outdoor heat exchanger during the operation of defrosting the outdoor heat exchanger. In the present aspect of the invention, this makes it possible to suppress the incidence of melted frost remaining on the outer surfaces of any heat transfer tube constituting the outdoor heat exchanger, and to satisfactorily defrost the outdoor heat exchanger.

An air conditioning apparatus according to a sixth aspect has a refrigerant circuit configured by connecting a compressor, an outdoor heat exchanger, an expansion valve, and an indoor heat exchanger, and the air conditioning apparatus performs an air-cooling operation for cooling air in a room by circulating refrigerant through the compressor, the outdoor heat exchanger, the expansion valve, and the indoor heat exchanger in the stated order. The indoor heat exchanger here is a heat exchanger in which flat perforated tubes are used as heat transfer tubes. When an oil-accumulation-resolving criterion is met during the air-cooling operation, low-refrigerant-circulation control, in which refrigerant is circulated through the compressor, the outdoor heat exchanger, the expansion valve, and the indoor heat exchanger in the stated order, is performed by a controller of the air conditioning apparatus for a predetermined time with the operating capacity of the compressor having been lowered to a predetermined capacity.

As described above in the present aspect of the invention, when the oil-accumulation-resolving criterion is met during the air-cooling operation, low-refrigerant-circulation control, in which refrigerant is circulated through the compressor, the outdoor heat exchanger, the expansion valve, and the indoor heat exchanger in the stated order, is performed for a predetermined time with the operating capacity of the compressor having been lowered to a predetermined capacity.

Refrigerant then circulates within the refrigerant circuit in the same direction as the air-cooling operation during low-refrigerant-circulation control, but due to the decrease in the operating capacity of the compressor, the state of refrigerant drift within the indoor heat exchanger changes, and the refrigerant flow rate tends to increase in the heat transfer tubes where refrigerating oil has accumulated. Refrigerating oil accumulated in the heat transfer tubes is thereby expelled by the flow of refrigerant, and refrigerating oil accumulation in the heat transfer tubes can be resolved.

DESCRIPTION OF EMBODIMENTS

An embodiment and modifications of an air conditioning apparatus according to the present invention are described below on the basis of the drawings. The specific configuration of the air conditioning apparatus according to the present invention is not limited to the embodiment and modifications described below, and can be altered within a range that does not deviate from the scope of the invention.

(1) Configuration of Air Conditioning Apparatus

Figure 1:
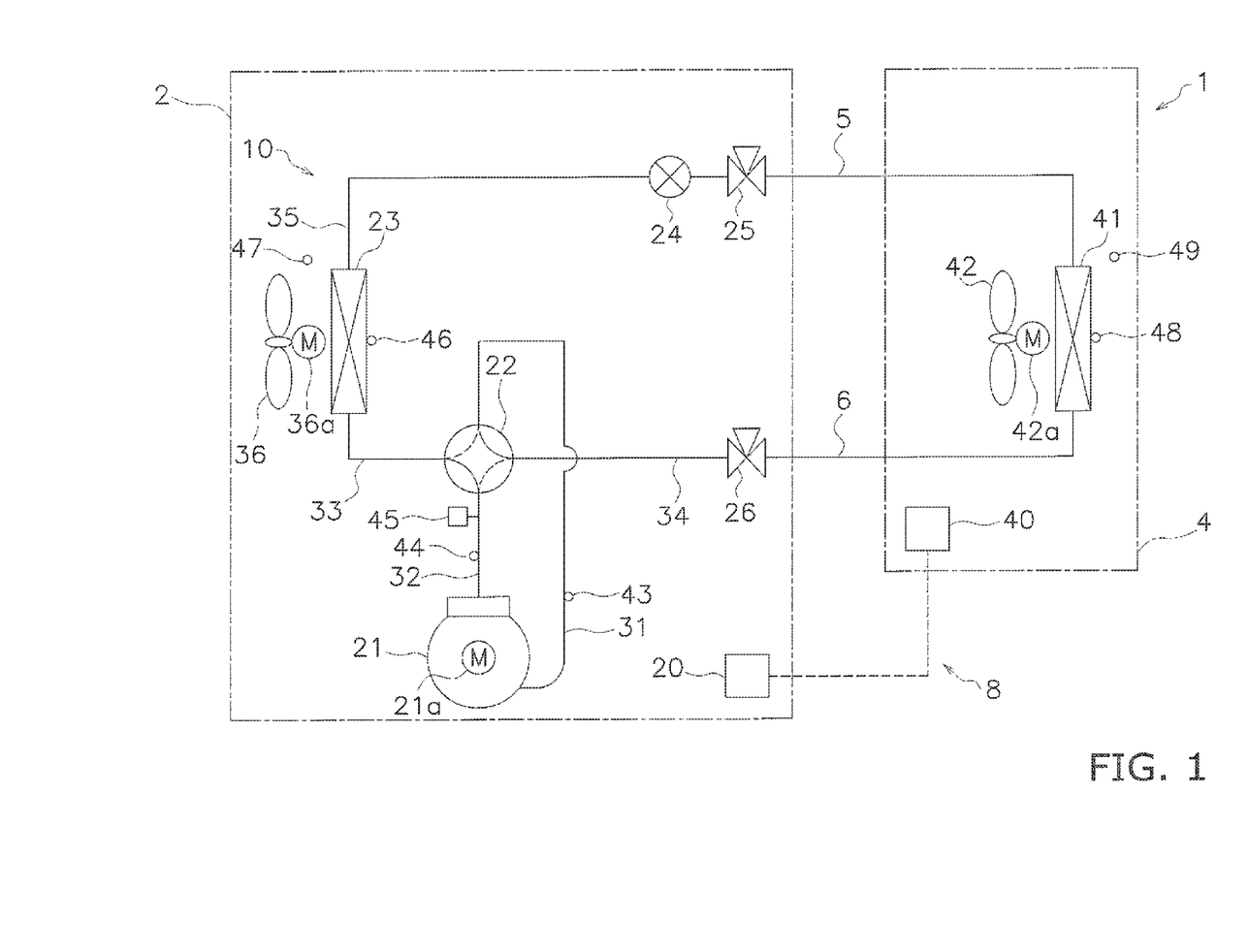
FIG. 1 is a schematic configuration drawing of an air conditioning apparatus according to an embodiment of the present invention.

FIG. 1 is a schematic configuration drawing of an air conditioning apparatus 1 according to an embodiment of the present invention.

The air conditioning apparatus 1 is an apparatus capable of cooling and warming the air in a room of a building or the like by performing a vapor-compression refrigeration cycle. The air conditioning apparatus 1 is configured by connecting primarily an outdoor unit 2 and an indoor unit 4. The outdoor unit 2 and the indoor unit 4 are connected via a liquid refrigerant communication pipe 5 and a gas refrigerant communication pipe 6. Specifically, a vapor-compression refrigerant circuit 10 of the air conditioning apparatus 1 is configured by the outdoor unit 2 and the indoor unit 4 being connected via the refrigerant communication pipes 5, 6.

<Indoor Unit>

The indoor unit 4, which is installed in a room, constitutes a part of the refrigerant circuit 10. The indoor unit 4 has primarily an indoor heat exchanger 41, The indoor heat exchanger 41 is a heat exchanger that functions as an evaporator of refrigerant to cool indoor air during an air-cooling operation, and functions as a radiator of refrigerant to heat indoor air during an air-warming operation. The liquid side of the indoor heat exchanger 41 is connected to the liquid refrigerant communication pipe 5, and the gas side of the indoor heat exchanger 41 is connected to the gas refrigerant communication pipe 6.

The indoor unit 4 has an indoor fan 42 for drawing indoor air into the indoor unit 4, and supplying the air back into the room as supply air after the air has exchanged heat with the refrigerant in the indoor heat exchanger 41. Specifically, the indoor unit 4 has an indoor fan 42 as a fan for supplying the indoor heat exchanger 41 with indoor air as a source for heating or cooling the refrigerant flowing through the indoor heat exchanger 41. The indoor fan 42 in this case is a centrifugal fan, multi-blade fan, or the like driven by an indoor fan motor 42a of which the rotational speed can be controlled. Specifically, the indoor fan 42 is configured such that the airflow volume can be controlled. The airflow volume of the indoor fan 42 in this case can be controlled among four levels: high airflow volume H, medium airflow volume M, low airflow volume L, and lowest airflow volume LL.

Various sensors are provided to the indoor unit 4. Specifically, the indoor heat exchanger 41 is provided with an indoor heat exchange temperature sensor 48 for detecting the temperature Trr of refrigerant in the indoor heat exchanger 41. The indoor unit 4 is provided with an indoor air temperature sensor 49 for detecting the temperature Tra of indoor air drawn into the indoor unit 4.

The indoor unit 4 has an indoor-side controller 40 for controlling the actions of the components constituting the indoor unit 4. The indoor-side controller 40 has a microcomputer, a memory, and/or the like provided in order to control the indoor unit 4, and the controller is designed to be able to exchange control signals and the like with a remote controller (not shown) for separately manipulating the indoor unit 4, and to exchange control signals and the like with the outdoor unit 2 via a transmission line, <Outdoor Unit>

The outdoor unit 2, which is installed outdoors, constitutes a part of the refrigerant circuit 10. The outdoor unit 2 has primarily a compressor 21, a four-way switching valve 22, an outdoor heat exchanger 23, an expansion valve 24, a liquid-side shutoff valve 25, and a gas-side shutoff valve 26.

The compressor 21 is a device for compressing refrigerant at a low pressure in the refrigeration cycle to a high pressure. The compressor 21 has a hermetically sealed structure in which a rotary, scroll, or other type of positive displacement compression element (not shown) is rotatably driven by a compressor motor 21a of which the frequency (rotational speed) can be controlled by an inverter. Specifically, the compressor 21 is configured such that the operating capacity can be controlled. The operating capacity of the compressor 21 can in this case be controlled to multiple levels from a lowest frequency to a highest frequency. An intake pipe 31 is connected to the intake side of the compressor 21, and a discharge pipe 32 is connected to the discharge side. The intake pipe 31 is a refrigerant pipe connecting the intake side of the compressor 21 and the four-way switching valve 22.

The discharge pipe 32 is a refrigerant pipe connecting the discharge side of the compressor 21 and the four-way switching valve 22.

The four-way switching valve 22 is a switching valve for switching the direction of refrigerant flow in the refrigerant circuit 10. During the air-cooling operation, the four-way switching valve 22 makes a switch to an air-cooling cycle state in which the outdoor heat exchanger 23 is made to function as a radiator of refrigerant compressed in the compressor 21, and the indoor heat exchanger 41 is made to function as an evaporator of refrigerant that has radiated heat in the outdoor heat exchanger 23. Specifically, during the air-cooling operation, the discharge side of the compressor 21 (the discharge pipe 32 in the present embodiment) and the gas side of the outdoor heat exchanger 23 (a first gas refrigerant pipe 33 in the present embodiment) are connected in the four-way switching valve 22 (refer to the solid lines of the four-way switching valve 22 in FIG. 1). Moreover, the intake side of the compressor 21 (the intake pipe 31 in the present embodiment) and the gas refrigerant communication pipe 6 side (a second gas refrigerant pipe 34 in the present embodiment) are connected (refer to the solid lines of the four-way switching valve 22 in FIG. 1). During the air-warming operation, the four-way switching valve 22 makes a switch to an air-warming cycle state in which the outdoor heat exchanger 23 is made to function as an evaporator of refrigerant that has radiated heat in the indoor heat exchanger 41, and the indoor heat exchanger 41 is made to function as a radiator of refrigerant compressed in the compressor 21. Specifically, during the air-warming operation, the four-way switching valve 22 connects the discharge side of the compressor 21 (the discharge pipe 32 in the present embodiment) and the gas refrigerant communication pipe 6 side (the second gas refrigerant pipe 34 in this case; refer to the dashed lines of the four-way switching valve 22 in FIG. 1). Moreover, the intake side of the compressor 21 (the intake pipe 31 in the present embodiment) and the gas side of the outdoor heat exchanger 23 (the first gas refrigerant pipe 33 in the present embodiment) are connected (refer to the dashed lines of the four-way switching valve 22 in FIG. 1). The first gas refrigerant pipe 33 is a refrigerant pipe connecting the four-way switching valve 22 and the gas side of the outdoor heat exchanger 23. The second gas refrigerant pipe 34 is a refrigerant pipe connecting the four-way switching valve 22 and the gas-side shutoff valve 26.

The outdoor heat exchanger 23 is a heat exchanger that during the air-cooling operation functions as a radiator of refrigerant using outdoor air as a cooling source, and during the air-warming operation functions as an evaporator of refrigerant using outdoor air as a heating source. The liquid side of the outdoor heat exchanger 23 is connected to a liquid refrigerant pipe 35, and the gas side is connected to the first gas refrigerant pipe 33. The liquid refrigerant pipe 35 is a refrigerant pipe connecting the liquid side of the outdoor heat exchanger 23 and the liquid refrigerant communication pipe 5 side. The outdoor heat exchanger 23 is a heat exchanger in which flat perforated tubes are used as heat transfer tubes.

Figure 2:
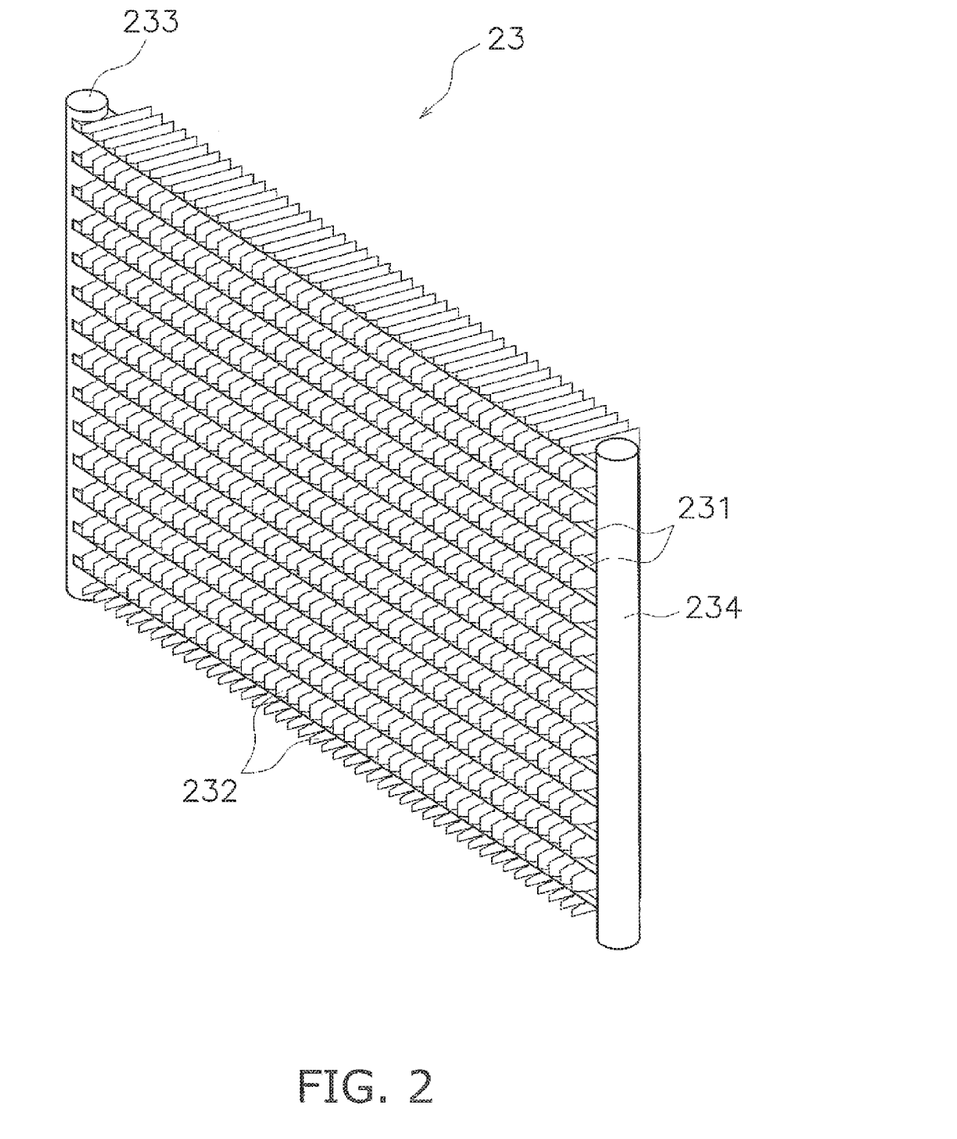
FIG. 2 is a schematic perspective view of an outdoor heat exchanger.
Figure 3:
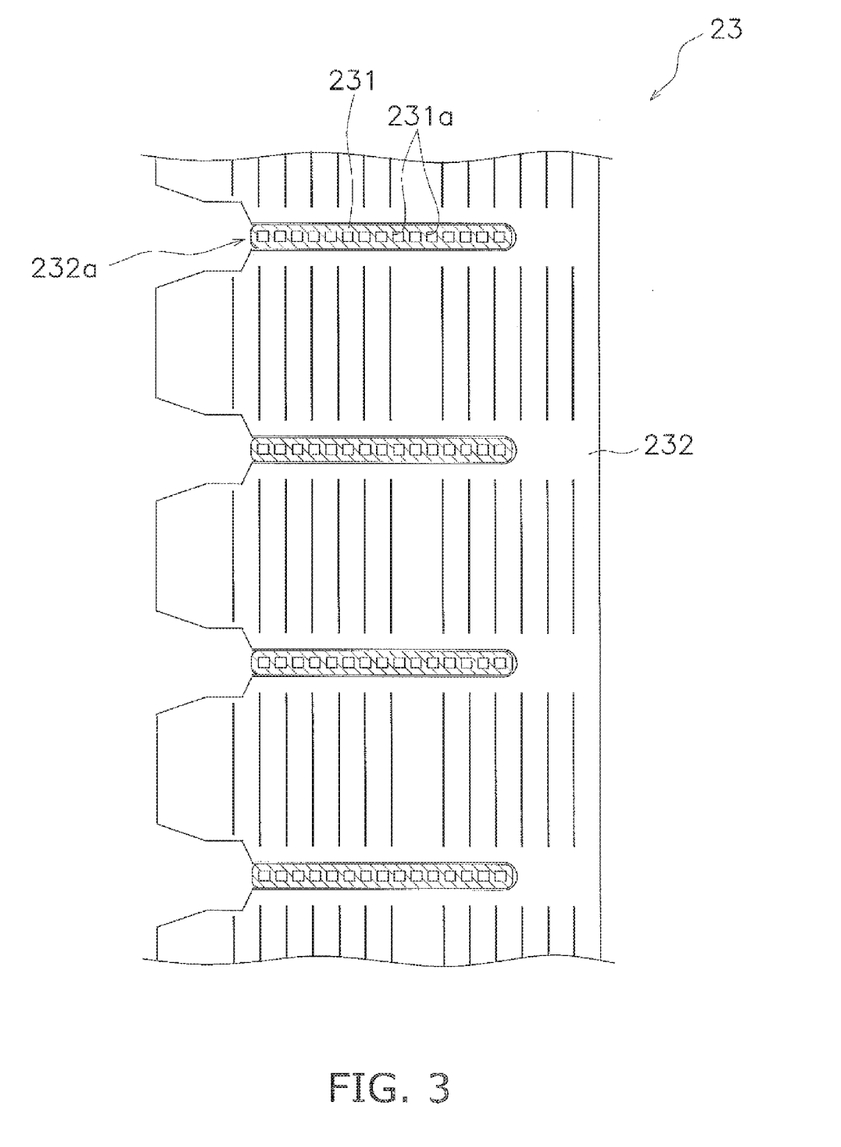
FIG. 3 is a schematic longitudinal cross-sectional view of the outdoor heat exchanger.
Figure 4:
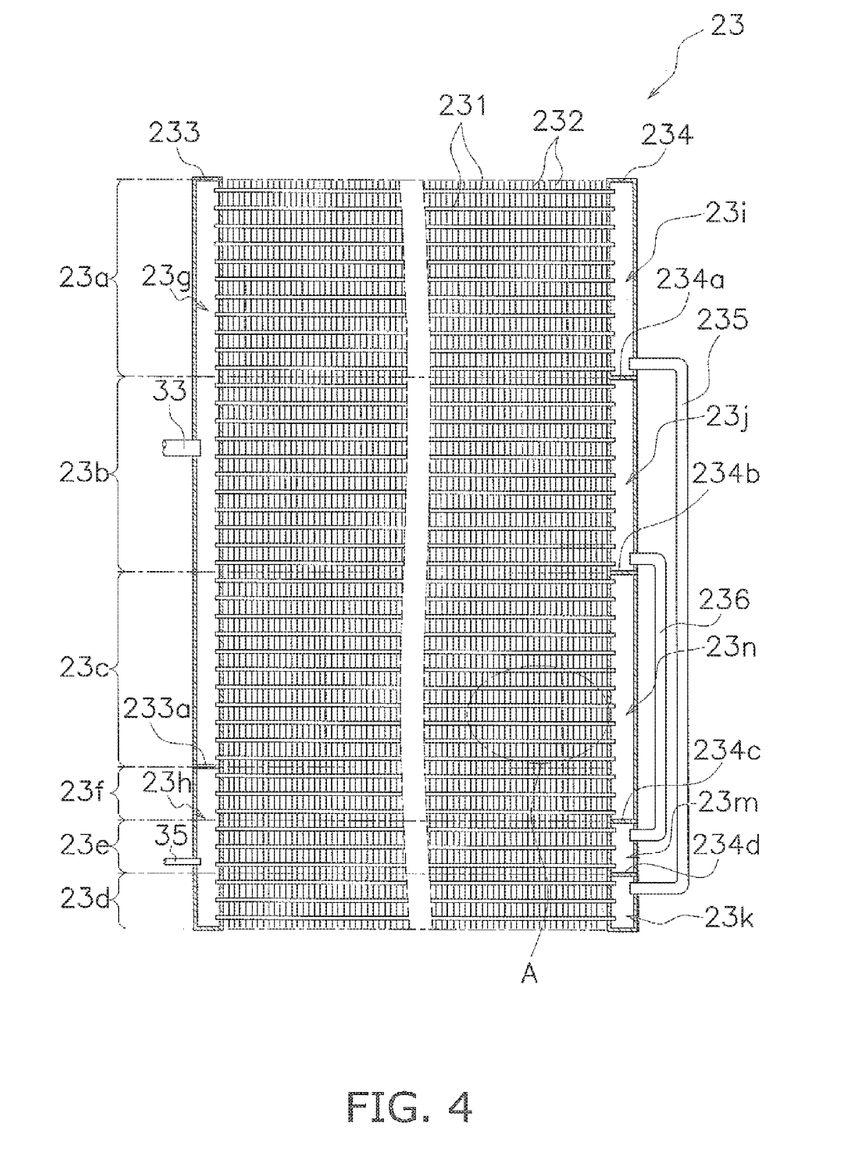
FIG. 4 is a drawing showing the refrigerant path in the outdoor heat exchanger.

Specifically, the outdoor heat exchanger 23 is an inserted-fin-type stacked heat exchanger configured primarily from heat transfer tubes 231 composed of flat perforated tubes, and numerous inserted fins 232, as shown in FIGS. 2 to 4. FIG. 2 is a schematic perspective view of the outdoor heat exchanger 23 (depictions of the refrigerant pipes 33, 35 and communication pipes 235, 236 are omitted). FIG. 3 is a schematic longitudinal cross-sectional view of the outdoor heat exchanger 23. FIG. 4 is a drawing showing the refrigerant path in the outdoor heat exchanger 23.

The heat transfer tubes 231 composed of flat perforated tubes are formed from aluminum or an aluminum alloy, and each tube has top and bottom flat-surface parts as heat transfer surfaces, and numerous small refrigerant flow channels 231a through which refrigerant flows. The refrigerant flow channels 231a have small polygonal flow channel holes that are either circular with an inside diameter of 1 mm or less, or polygonal with a similar cross-sectional area. The heat transfer tubes 231 are arrayed in multiple levels at intervals with the flat-surface parts facing upward and downward, each tube being connected at the ends to a first header collecting pipe 233 and a second header collecting pipe 234.

The inserted fins 232 are made of aluminum or an aluminum alloy, and are in contact with the heat transfer tubes 231. A plurality of long, thin notches 232a extending horizontally are formed in each inserted fin 232 so that the inserted fin 232 can be inserted onto the multiple levels of heat transfer tubes 231 arrayed between the both header collecting pipes 233, 234. The shape of the notches 232a of the inserted fins 232 substantially coincides with the cross-sectional outer shape of the heat transfer tubes 231.

The plurality of heat transfer tubes 231 are grouped into a plurality (three in the present embodiment) of main heat exchange parts 23a, 23b, 23c constituting the upper part of the outdoor heat exchanger 23, and a plurality (three in the present embodiment) of subordinate heat exchange parts 23d, 23e, 23f constituting the lower part of the outdoor heat exchanger 23. The first main heat exchange part 23a is a group of heat transfer tubes constituting the highest part of the outdoor heat exchanger 23, the second main heat exchange part 23b is a group of heat transfer tubes constituting the section on the bottom side of the first main heat exchange part 23a, and the third main heat exchange part 23c is a group of heat transfer tubes constituting the section on the bottom side of the second main heat exchange part 23b. The first subordinate heat exchange part 23d is a group of heat transfer tubes constituting the lowest part of the outdoor heat exchanger 23, the second subordinate heat exchange part 23e is a group of heat transfer tubes constituting the section on the top side of the first subordinate heat exchange part 23d, and the third subordinate heat exchange part 23f is a group of heat transfer tubes constituting the section on the top side of the second subordinate heat exchange part 23e.

The header collecting pipes 233, 234 have the function of supporting the heat transfer tubes 231, the function of guiding refrigerant to the refrigerant flow channels 231a of the heat transfer tubes 231, and the function of collecting refrigerant that has left the refrigerant flow channels 231a. The internal space of the first header collecting pipe 233 is partitioned top to bottom (into two parts in the present embodiment) by a partitioning plate 233a. The space above the partitioning plate 233a is an upper exit-entry space 23g for gas refrigerant corresponding to the main heat exchange parts 23a, 23b, 23c, and the space below the partitioning plate 233a is a lower exit-entry space 23h for liquid refrigerant corresponding to the subordinate heat exchange parts 23d, 23e, 23f. The first gas refrigerant pipe 33 is connected to the upper exit-entry space 23g of the first header collecting pipe 233, and the liquid refrigerant pipe 35 is connected to the lower exit-entry space 23h of the first header collecting pipe 233. The internal space of the second header collecting pipe 234 is partitioned top to bottom (into five parts in the present embodiment) by partitioning plates 234a, 234b, 234c, 234d. The space above the partitioning plate 234a is a first upper turn-back space 23i corresponding to the first main heat exchange part 23a, and the space vertically between the partitioning plate 234a and the partitioning plate 234b is a second upper turn-back space 23j corresponding to the second main heat exchange part 23b. The space below the partitioning plate 234d is a first lower turn-back space 23k corresponding to the first subordinate heat exchange part 23d, and the space vertically between the partitioning plate 234c and the partitioning plate 234d is a second lower turn-back space 23m corresponding to the second subordinate heat exchange part 23e. The first upper turn-back space 23i and the first lower turn-back space 23k are connected via a first communication pipe 235, and the second upper turn-back space 23j and the second lower turn-back space 23m are connected via a second communication pipe 236. The space below the partitioning plate 234b corresponding to the third main heat exchange part 23c and the space above the partitioning plate 234c corresponding to the third subordinate heat exchange part 23f constitute a single shared turn-back space 23n. Specifically, the upper turn-back spaces 23i, 23j are formed corresponding to the main heat exchange parts 23a, 23b and the tower turn-back spaces 23k, 23m are formed corresponding to the subordinate heat exchange parts 23d, 23e by partitioning the internal space of the second header collecting pipe 234 from top to bottom, excluding the third main heat exchange part 23c and the third subordinate heat exchange part 23f which of the plurality of main heat exchange parts 23a, 23b, 23c and the plurality of subordinate heat exchange parts 23d, 23e, 23f, are those that are vertically adjacent. The upper turn-back spaces 23i, 23j and the lower turn-back spaces 23k, 23m are connected via the communication pipes 235, 236, and the vertically adjacent third main heat exchange part 23c and third subordinate heat exchange part 23f are connected by the single shared turn-back space 23n.

In the air-cooling operation, gas refrigerant at a high pressure in the refrigeration cycle discharged from the compressor 21 flows through the first gas refrigerant pipe 33 into the upper exit-entry space 23g of the first header collecting pipe 233. Having flowed into the upper exit-entry space 23g, the refrigerant branches and passes through the first through third main heat exchange parts 23a, 23b, 23c to be sent to the upper turn-back spaces 23i, 23j and the shared turn-back space 23n of the second header collecting pipe 234. The refrigerant sent to the upper turn-back spaces 23i, 23j of the second header collecting pipe 234 is sent through the communication pipes 235, 236 to the lower turn-back spaces 23k, 23m. The refrigerant sent to the lower turn-back spaces 23k, 23m and the refrigerant sent to the shared turn-back space 23n are sent respectively through the first through third main heat exchange parts 23d, 23e, 23f to the lower exit-entry space 23h of the first header collecting pipe 233, where the refrigerant merges together. The refrigerant sent to the lower exit-entry space 23h radiates heat and becomes liquid refrigerant when passing through the heat exchange parts 23a to 23b, after which the refrigerant is sent through the liquid refrigerant pipe 35 to the expansion valve 24. In the air-warming operation, gas-liquid two-phase refrigerant that has been depressurized in the expansion valve 24 to a low pressure in the refrigeration cycle flows through the liquid refrigerant pipe 35 into the lower exit-entry space 23h of the first header collecting pipe 233. Having flowed into the lower exit-entry space 23h, the refrigerant branches, and the branches are respectively sent through the first through third subordinate heat exchange parts 23d, 23e, 23f to the lower turn-back spaces 23k, 23m and the shared turn-back space 23n of the second header collecting pipe 234. The refrigerant sent to the lower turn-back spaces 23k, 23m of the second header collecting pipe 234 is sent through the communication pipes 235, 236 to the upper turn-back spaces 23i, 23j. The refrigerant sent to the upper turn-back spaces 23i, 23j and the refrigerant sent to the shared turn-back space 23n are sent respectively through the first through third main heat exchange parts 23a, 23b, 23c to the upper exit-entry space 23g of the first header collecting pipe 233, where the refrigerant merges together. The refrigerant sent to the upper exit-entry space 23g evaporates into gas refrigerant when passing through the heat exchange parts 23a to 23b, after which the refrigerant is sent through the first gas refrigerant pipe 33 to the compressor 21.

The expansion valve 24 is a valve which, during the air-cooling operation, depressurizes refrigerant that has radiated heat in the outdoor heat exchanger 23 from a high pressure in the refrigeration cycle to a low pressure in the refrigeration cycle. The expansion valve 24 is also a valve which, during the air-warming operation, depressurizes refrigerant that has radiated heat in the indoor heat exchanger 41 from a high pressure in the refrigeration cycle to a low pressure in the refrigeration cycle. The expansion valve 24 is provided to a portion of the liquid refrigerant pipe 35 that is near the liquid-side shutoff valve 25. An electric expansion valve is used as the expansion valve 24 in the present embodiment.

The liquid-side shutoff valve 25 and the gas-side shutoff valve 26 are provided to ports that connect with external devices or pipes (specifically, the liquid refrigerant communication pipe 5 and the gas refrigerant communication pipe 6). The liquid-side shutoff valve 25 is provided to the end of the liquid refrigerant pipe 35. The gas-side shutoff valve 26 is provided to the end of the second gas refrigerant pipe 34.

The outdoor unit 2 is provided with an outdoor fan 36 for drawing outdoor air into the outdoor unit 2, and expelling the air outside after the air has exchanged heat with refrigerant in the outdoor heat exchanger 23. Specifically, the outdoor unit 2 has an outdoor fan 36 as a fan for supplying the outdoor heat exchanger 23 with outdoor air as a source for cooling or heating refrigerant flowing through the outdoor heat exchanger 23. The outdoor fan 36 in the present embodiment is a propeller fan or the like driven by an outdoor fan motor 36a.

Various sensors are provided to the outdoor unit 2. Specifically, the outdoor heat exchanger 23 is provided with an outdoor heat exchange temperature sensor 46 for detecting the temperature Tor of refrigerant in the outdoor heat exchanger 23. The outdoor unit 2 is also provided with an outdoor air temperature sensor 47 for detecting the temperature Toa of outdoor air drawn into the outdoor unit 2. The intake pipe 31 or the compressor 21 is provided with an intake temperature sensor 43 for detecting the temperature Ts of refrigerant at a low pressure in the refrigeration cycle drawn into the compressor 21. The discharge pipe 32 or the compressor 21 is provided with a discharge temperature sensor 44 for detecting the temperature Td of refrigerant at a high pressure in the refrigeration cycle discharged from the compressor 21. The discharge pipe 32 or the compressor 21 is provided with a discharge pressure sensor 45 for detecting the pressure Pd of refrigerant at a high pressure in the refrigeration cycle discharged from the compressor 21.

The outdoor unit 2 has an outdoor-side controller 20 for controlling the actions of the components constituting the outdoor unit 2. The outdoor-side controller 20 has a microcomputer, a memory, and/or the like provided in order to control the outdoor unit 2, and the controller is designed to be able to exchange control signals and the like with the indoor unit 4 via a transmission line.

<Refrigerant Communication Pipes>

The refrigerant communication pipes 5, 6 are refrigerant pipes constructed on site when the air conditioning apparatus 1 is installed in a building or another installation location, for which pipes are used that have various lengths and/or diameters in accordance with the installation location, the combination of the outdoor unit and indoor unit, and other installation conditions.

As described above, the refrigerant circuit 10 of the air conditioning apparatus 1 is configured by connecting the outdoor unit 2, the indoor unit 4, and the refrigerant communication pipes 5, 6. The air conditioning apparatus 1 is designed so as to perform an air-warming operation of warming the air in the room by causing refrigerant to circulate sequentially through the compressor 21, the indoor heat exchanger 41, the expansion valve 24, and the outdoor heat exchanger 23. The outdoor heat exchanger 23 in this case is a heat exchanger in which flat perforated tubes are used as the heat transfer tubes 231.

<Controller>

Figure 5:
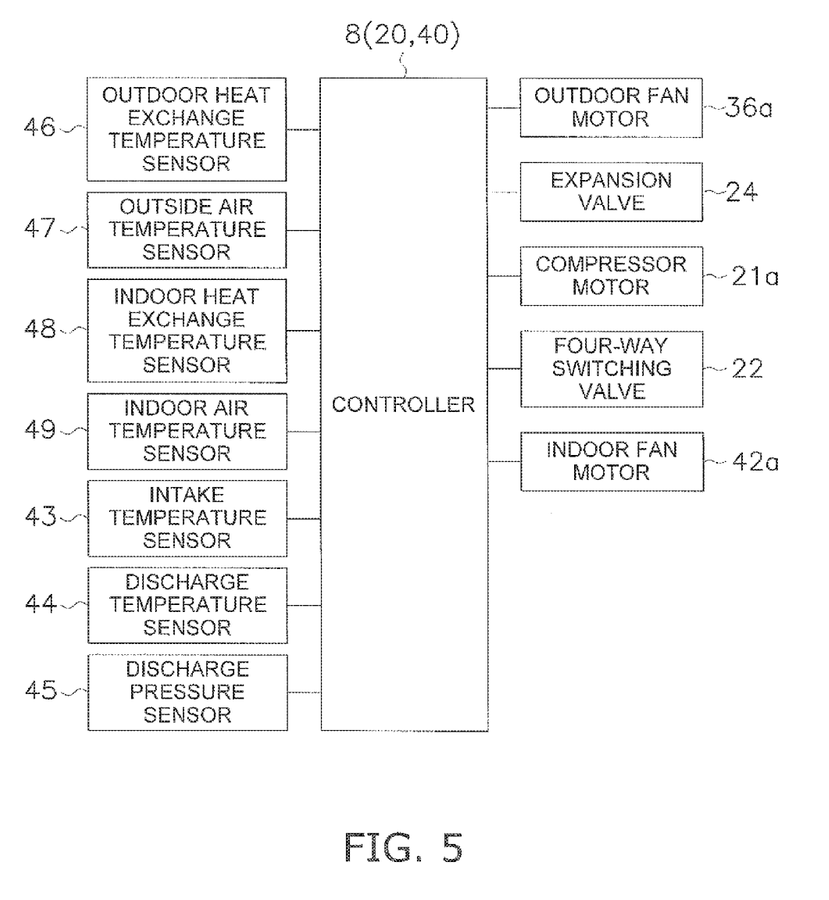
FIG. 5 is a control block diagram of the air conditioning apparatus.

The air conditioning apparatus 1 is designed so that the various devices of the outdoor unit 2 and the indoor unit 4 can be controlled by a controller 8 configured from the indoor-side controller 40 and the outdoor-side controller 20. Specifically, the controller 8 for performing operation control on the entire air conditioning apparatus 1 is configured from the indoor-side controller 40, the outdoor-side controller 20, and a transmission line connecting the two.

The controller 8 is connected so as to be able to receive detection signals from the various sensors 43 to 49 and the like, and is connected so as to be able to control the various devices and valves 21, 22, 24, 36, 42, and the like on the basis of these detection signals.

(2) Basic Actions of Air Conditioning Apparatus

Next, the basic actions of the air conditioning apparatus 1 will be described using FIG. 1. The air conditioning apparatus 1 is capable to performing an air-cooling operation and an air-warming operation as basic actions. During the air-warming operation, a defrosting operation can also be performed for melting frost adhering to the outdoor heat exchanger 23. Furthermore, when the air-cooling operation mod/or the air-warming operation is performed for a long period of time, a risk is presented that refrigerating oil sealed within the refrigerant circuit 10 for lubricating the compressor 21 might accumulate in various locations in the refrigerant circuit 10 and the compressor 21 might not be sufficiently lubricated, except that oil return control is performed in order to eliminate this risk. The air-cooling operation, the air-warming operation, the defrosting operation, and oil return control are performed by the controller 8.

<Air-Cooling Operation>

During the air-cooling operation, the four-way switching valve 22 is switched to the air-cooling cycle state (the state shown by the solid lines in FIG. 1).

In the refrigerant circuit 10, gas refrigerant at a low pressure in the refrigeration cycle is drawn into the compressor 21, compressed to a high pressure in the refrigeration cycle, and then discharged.

The high-pressure gas refrigerant discharged from the compressor 21 is sent through the four-way switching valve 22 to the outdoor heat exchanger 23.

The high-pressure gas refrigerant sent to the outdoor heat exchanger 23 exchanges heat in the outdoor heat exchanger 23 with outdoor air supplied as a cooling source by the outdoor fan 36, and the refrigerant radiates heat and becomes high-pressure liquid refrigerant.

The high-pressure liquid refrigerant that has radiated heat in the outdoor heat exchanger 23 is sent to the expansion valve 24.

The high-pressure liquid refrigerant sent to the expansion valve 24 is depressurized by the expansion valve 24 to a low pressure in the refrigeration cycle, and the refrigerant becomes low-pressure gas-liquid two-phase refrigerant. The low-pressure gas-liquid two-phase refrigerant depressurized in the expansion valve 24 is sent through the liquid-side shutoff valve 25 and the liquid refrigerant communication pipe 5 to the indoor heat exchanger 41.

The low-pressure gas-liquid two-phase refrigerant sent to the indoor heat exchanger 41 exchanges heat in the indoor heat exchanger 41 with indoor air supplied as a heating source by the indoor fan 42, and the refrigerant evaporates. The indoor air is thereby cooled and is then supplied back into the room, whereby air-cooling of the room is performed.

The low-pressure gas refrigerant evaporated in the indoor heat exchanger 41 is drawn back into the compressor 21 through the gas refrigerant communication pipe 6, the gas-side shutoff valve 26, and the four-way switching valve 22.

<Air-Warming Operation>

During the air-warming operation, the four-way switching valve 22 is switched to the air-warming cycle state (the state shown by the dashed lines in FIG. 1).

In the refrigerant circuit 10, gas refrigerant at a low pressure in the refrigeration cycle is drawn into the compressor 21, compressed to a high pressure in the refrigeration cycle, and then discharged.

The high-pressure gas refrigerant discharged from the compressor 21 is sent through the four-way switching valve 22, the gas-side shutoff valve 26, and the gas refrigerant communication pipe 6 to the indoor heat exchanger 41.

The high-pressure gas refrigerant sent to the indoor heat exchanger 41 exchanges heat in the indoor heat exchanger 41 with indoor air supplied as a cooling source by the indoor fan 42, and the refrigerant radiates heat and becomes high-pressure liquid refrigerant. The indoor air is thereby heated and then supplied back into the room, whereby air-warming of the room is performed.

Having radiated heat in the indoor heat exchanger 41, the high-pressure liquid refrigerant is sent through the liquid refrigerant communication pipe 5 and the liquid-side shutoff valve 25 to the expansion valve 24.

The high-pressure liquid refrigerant sent to the expansion valve 24 is depressurized to a low pressure in the refrigeration cycle by the expansion valve 24, becoming low-pressure gas-liquid two-phase refrigerant. The low-pressure gas-liquid two-phase refrigerant depressurized in the expansion valve 24 is sent to the outdoor heat exchanger 23.

The low-pressure gas-liquid two-phase refrigerant sent to the outdoor heat exchanger 23 exchanges heat in the outdoor heat exchanger 23 with outdoor air supplied as a heating source by the outdoor fan 36, and the refrigerant evaporates into low-pressure gas refrigerant.

The low-pressure refrigerant evaporated in the outdoor heat exchanger 23 is drawn back into the compressor 21 through the four-way switching valve 22.

<Defrosting Operation>

During the air-warming operation described above, when frost formation in the outdoor heat exchanger 23 is detected due to an event such as the temperature Tor of refrigerant in the outdoor heat exchanger 23 being lower than a predetermined temperature, i.e., when the condition for initiating the operation of defrosting the outdoor heat exchanger 23 is reached, the defrosting operation is performed for melting the frost adhering to the outdoor heat exchanger 23.

As the defrosting operation, a reverse cycle defrosting operation is performed for making the outdoor heat exchanger 23 function as a radiator of refrigerant by switching the four-way switching valve 22 to the air-cooling cycle state (the state shown by the solid lines in FIG. 1), similar to the air-cooling operation. Frost adhering to the outdoor heat exchanger 23 can thereby be melted. This defrosting operation is performed until a predetermined defrosting operation time has elapsed, which is set in view of factors such as the state of the air-warming operation prior to the defrosting operation, after which the air-warming operation is resumed. The flow of refrigerant within the refrigerant circuit 10 during the defrosting operation is similar to the air-cooling operation described above, and is therefore not described here.

<Oil Return Control>

When the above-described air-cooling operation and/or air-warming operation is performed for a long time, there is a risk that refrigerating oil will accumulate in various locations in the refrigerant circuit 10 and the compressor 21 will not be sufficiently lubricated. Therefore, in order to eliminate this risk, oil return control is performed for returning refrigerating oil accumulated in various locations in the refrigerant circuit 10 to the compressor 21.

As oil return control, control is performed in which the four-way switching valve 22 is set to the air-cooling cycle state (the state shown by the solid lines in FIG. 1) similar to the air-cooling operation, the operating capacity of the compressor 21 is increased above the normal operating capacity during the air-cooling operation, and the opening degree of the expansion valve 24 is enlarged above the normal opening degree during the air-cooling operation, whereby the flow rate of refrigerant circulating within the refrigerant circuit 10 is increased, and the refrigerant returning to the compressor 21 has more wet. Specifically, the operating capacity of the compressor 21 is increased nearly to the maximum frequency, and the opening degree of the expansion valve 24 is enlarged nearly to fully open. When oil return control is performed during the air-cooling operation, it is performed by temporarily setting the operating capacity of the compressor 21 and the opening degree of the expansion valve 24 to the states described above. When oil return control is performed during the air-warming operation, it is performed simultaneously with the defrosting operation described above.

(3) Low-Refrigerant-Circulation Control

The air conditioning apparatus 1 has an outdoor heat exchanger 23 composed of a heat exchanger in which flat perforated tubes are used as heat transfer tubes 231 as described above. Therefore, refrigerant drifts in the outdoor heat exchanger 23 during the air-warming operation described above, which causes the refrigerant flow rate to decrease in the heat transfer tubes 231 composed of flat perforated tubes constituting the outdoor heat exchanger 23, and refrigerating oil tends to readily accumulate in the heat transfer tubes 231 because the refrigerant flow channels 231a in the heat transfer tubes 231 are small.

Particularly, as described above, the outdoor heat exchanger 23 has a structure of being sectioned into a plurality (three in the present embodiment) of main heat exchange parts 23a to 23c constituting the top part, and a plurality (three in the present embodiment) of subordinate heat exchange parts 23d to 23f constituting the bottom part, the main heat exchange parts 23a to 23c and the subordinate heat exchange parts 23d to 23f being connected through the turn-back spaces 23i, 23j, 23k, 23m, 23n of the second header collecting pipe 234. Moreover, concerning the main heat exchange parts 23a, 23b and the subordinate heat exchange parts 23d, 23e excluding the vertically adjacent third main heat exchange part 23c and third subordinate heat exchange part 23f, the corresponding turn-back spaces 23i, 23j, 23k, 23m are connected via the communication pipes 235, 236, and the vertically adjacent third main heat exchange part 23c and third subordinate heat exchange part 23f are connected by the single shared turn-back space 23n (i.e., not via a communication pipe). In this type of structure, during the air-warming operation, liquid refrigerant is sent from the subordinate heat exchange parts 23d to 23f through the turn-back spaces 23i, 23j, 23k, 23m, 23n of the second header collecting pipe 234 to the main heat exchange parts 23a to 23c where the refrigerant evaporates, but at this time, in the vertically adjacent third main heat exchange part 23c and third subordinate heat exchange part 23f connected by the single shared turn-back space 23n, refrigerant readily drifts such that the refrigerant flow rate through the heat transfer tubes 231 disposed in the bottom part of the main heat exchange part 23c is less than the refrigerant flow rate through the heat transfer tubes 231 disposed in the top part of the main heat exchange part 23c. When refrigerant drifts in this manner, refrigerating oil accumulates in the heat transfer tubes 231 that constitute the bottom part of the third main heat exchange part 23c vertically adjacent to and connected by the single shared turn-back space 23n to the third subordinate heat exchange part 23f (refer to the bottom part A of the third main heat exchange part 23c shown in FIG. 4).

When refrigerating oil thus accumulates in the heat transfer tubes 231 and, e.g., the defrosting operation is performed to defrost the outdoor heat exchanger 23 described above, refrigerant does not readily flow to the heat transfer tubes 231 where refrigerating oil has accumulated, due to increased flow channel resistance in the heat transfer tubes 231 caused by the accumulated refrigerating oil. This causes a risk that frost will melt and remain on the outer surfaces of the heat transfer tubes 231 where refrigerating oil has accumulated, and that the outdoor heat exchanger 23 will be inadequately defrosted. Because flow channel resistance increases in the heat transfer tubes 231 constituting the bottom part A of the third main heat exchange part 23c shown in FIG. 4 and refrigerant does not readily flow to the heat transfer tubes 231 constituting this bottom part. A, there is a risk that frost will melt and remain the outer surfaces thereof and the outdoor heat exchanger 23 will be inadequately defrosted.

In view of this, in the air conditioning apparatus 1, when an oil-accumulation-resolving criterion (the criterion for initiating the operation of defrosting the outdoor heat exchanger 23 in the present embodiment) is met during the air-warming operation, low-refrigerant-circulation control is performed for a predetermined time (the low refrigerant circulation time to in the present embodiment) to cause refrigerant to circulate sequentially through the compressor 21, the indoor heat exchanger 41, the expansion valve 24, and the outdoor heat exchanger 23 with the operating capacity of the compressor 21 having been lowered to a predetermined capacity (the low refrigerant circulation frequency fo in the present embodiment).

Figure 6:
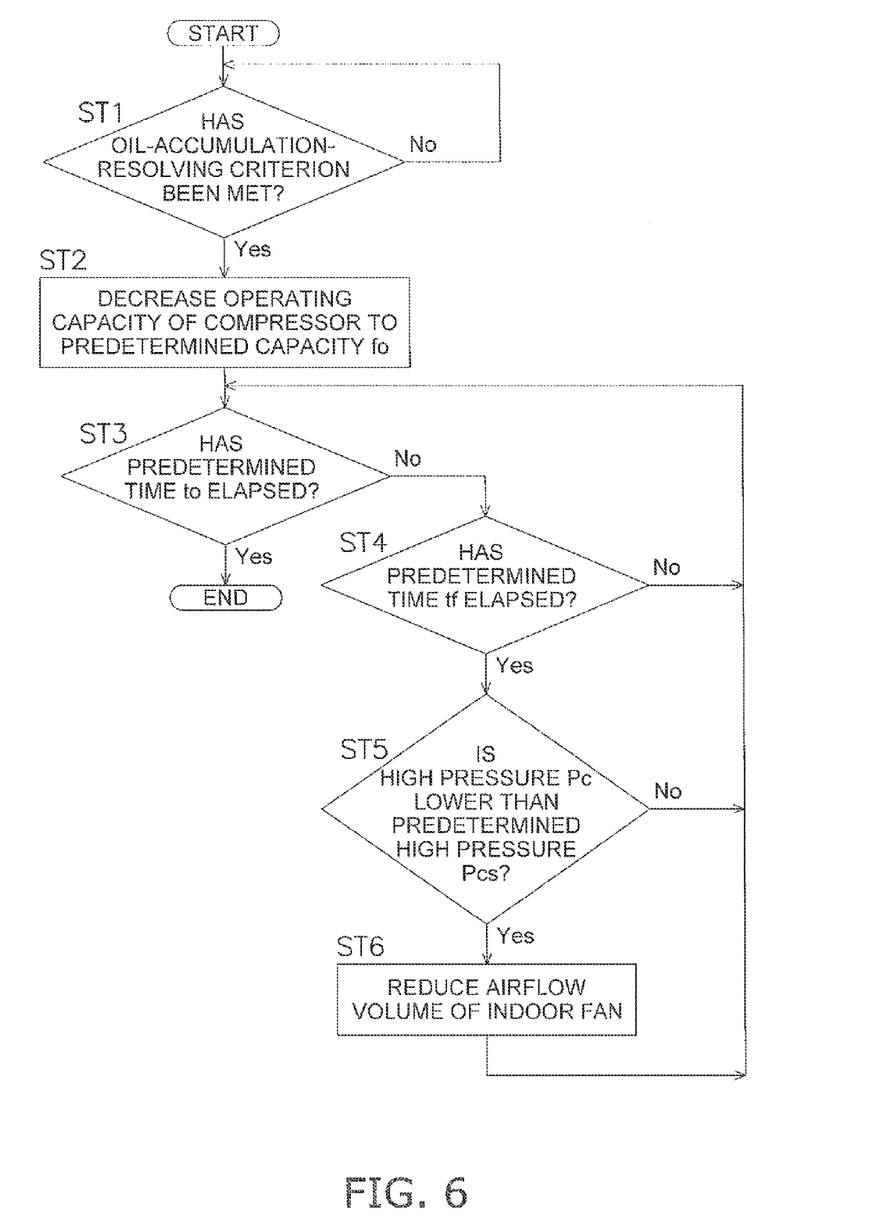
FIG. 6 is a flowchart of low-refrigerant-circulation control.
Figure 7:
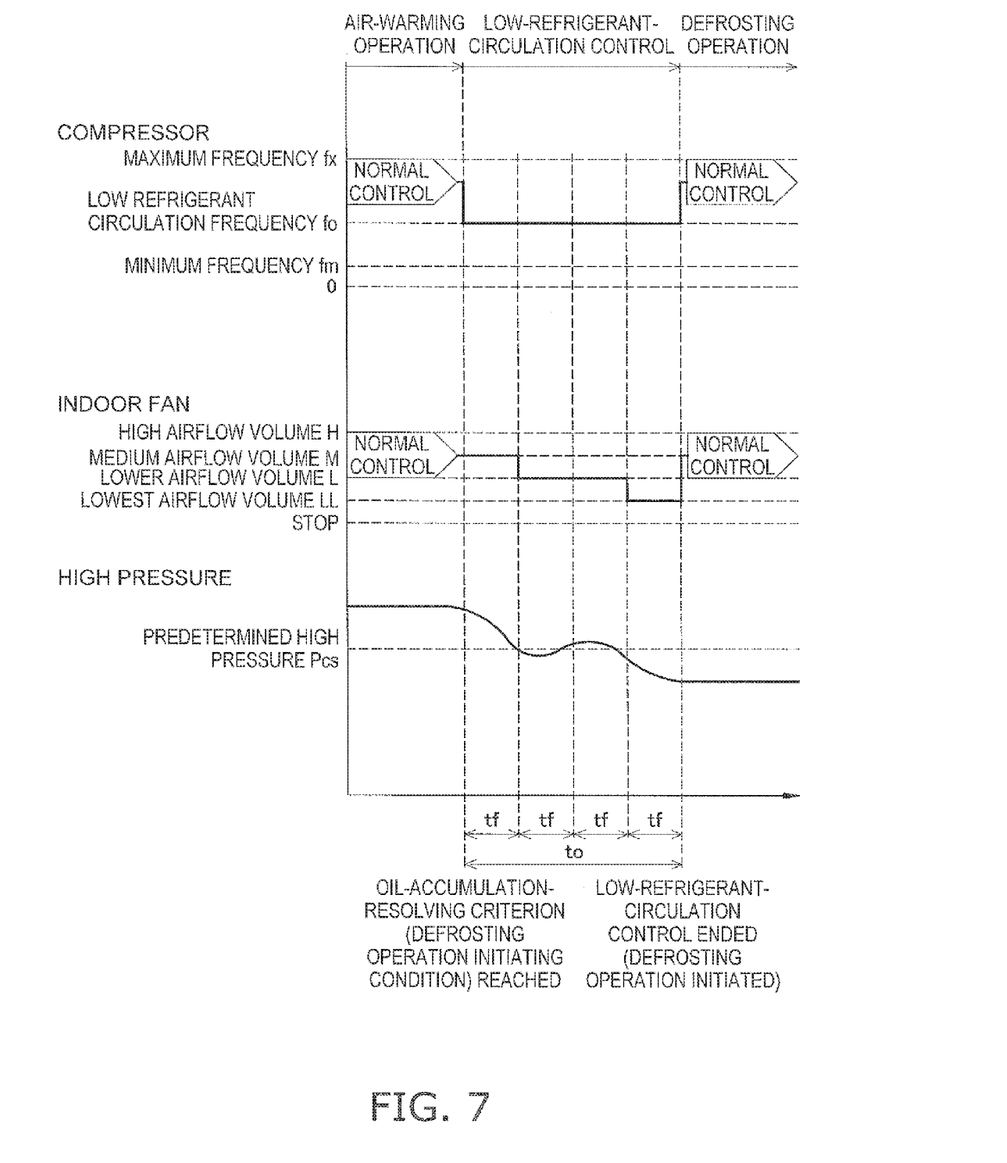
FIG. 7 is a time chart of the compressor, the indoor fan, and high pressure during low-refrigerant-circulation control.

Next, low-refrigerant-circulation control is described using FIGS. 1 to 7. FIG. 6 is a flowchart of low-refrigerant-circulation control. FIG. 7 is a time chart of the compressor 21, the indoor fan 42, and high pressure Pc during low-refrigerant-circulation control. The low-refrigerant-circulation control described below is performed by the controller 8, similar to the basic actions described above.

<Step ST1>

During the air-warming operation, the controller 8 first determines in step ST1 whether or not the oil-accumulation-resolving criterion has been met. The condition for initiating the operation of defrosting the outdoor heat exchanger 23 is the oil-accumulation-resolving criterion in this case. Specifically, a determination is made as to whether or not frost has been detected to form in the outdoor heat exchanger 23, according to a factor such as the temperature Tor of refrigerant in the outdoor heat exchanger 23 being lower than a predetermined temperature, as described above.

The reason that the criterion for initiating the operation of defrosting the outdoor heat exchanger 23 is the oil-accumulation-resolving criterion is because as described above, when refrigerating oil accumulates in the heat transfer tubes 231 of the outdoor heat exchanger 23 during the air-warming operation, there is a risk that frost will melt and remain on the outer surfaces of the heat transfer tubes 231 where the refrigerating oil has accumulated during the defrosting operation, and the outdoor heat exchanger 23 will be inadequately defrosted.

When it is determined in step ST1 that the oil-accumulation-resolving criterion has been met (i.e., when the criterion for initiating the operation of defrosting the outdoor heat exchanger 23 is met), the sequence transitions to the processes of step ST2 onwards.

<Steps ST2, ST3>

Next, in steps ST2 and ST3, the controller 8 performs low-refrigerant-circulation control for a predetermined time cause refrigerant to circulate sequentially through the compressor 21, the indoor heat exchanger 41, the expansion valve 24, and the outdoor heat exchanger 23, with the operating capacity of the compressor 21 having been lowered to a predetermined capacity. Specifically, in this case, low-refrigerant-circulation control is performed before the operation of defrosting the outdoor heat exchanger 23 is performed.

The controller 8 lowers the operating capacity of the compressor 21 to the low refrigerant circulation frequency fo, which is equivalent to the predetermined capacity. The low refrigerant circulation frequency fo is set to a value near the minimum frequency fm in order to change the state of refrigerant drifting in the outdoor heat exchanger 23. The controller 8 also sets the predetermined time for performing low-refrigerant-circulation control to the low refrigerant circulation time to. The low refrigerant circulation time to is set to a time (e.g., about several minutes) that would make it possible for the refrigerating oil accumulated in the outdoor heat exchanger 23 during the air-warming operation to be expelled by low-refrigerant-circulation control.

Doing so causes refrigerant to circulate within the refrigerant circuit 10 in the same direction as the air-warming operation during low-refrigerant-circulation control, but due to the above-described decrease in the operating capacity of the compressor 21, there is a tendency for the state of refrigerant drift in the outdoor heat exchanger 23 to change and the refrigerant flow rate to increase in the heat transfer tubes 231 where refrigerating oil has accumulated. There is a tendency for the refrigerant flow rate to increase particularly in the heat transfer tubes 231 constituting the bottom part of the third main heat exchange part 23c which is vertically adjacent and connected by the single shared turn-back space 23n. Refrigerating oil accumulated in the heat transfer tubes 231 (i.e., in the heat transfer tubes 231 constituting the bottom part of the third main heat exchange part 23c which is vertically adjacent and connected to the third subordinate heat exchange part 23f by the single shared turn-back space 23n) is thereby expelled by the flow of refrigerant, and refrigerating oil accumulation in the heat transfer tubes 231 can be resolved.

In step ST3, after the low refrigerant circulation time to has elapsed, the operation of defrosting the outdoor heat exchanger 23 is initiated, in this case, refrigerating oil accumulated in the heat transfer tubes 231 during the air-warming operation is expelled by the low-refrigerant-circulation control described above before the operation of defrosting the outdoor heat exchanger 23 is performed. Therefore, refrigerant al so flows to any of the heat transfer tubes 231 constituting the outdoor heat exchanger 23 during the operation of defrosting the outdoor heat exchanger 23.

This results makes it possible to suppress the incidence of melted frost remaining on the outer surfaces of any of the heat transfer tubes 231 constituting the outdoor heat exchanger 23, and the outdoor heat exchanger 23 can be defrosted satisfactorily. The defrosting operation time can also be shortened.

The refrigerating oil accumulation in the heat transfer tubes 231 is expected to be resolved by performing the above-described oil return control simultaneously with the defrosting operation. However, contrary to low-refrigerant-circulation control which lowers the operating capacity of the compressor 21, oil return control increases the flow rate of refrigerant circulating within the refrigerant circuit 10 by increasing the operating capacity of the compressor 21 above the normal operating capacity during the air-cooling operation, and enlarging the opening degree of the expansion valve 24 above the normal opening degree during the air-cooling operation. The operating capacity (frequency) of the compressor 21 in oil return control in this case is greater than the predetermined capacity (the low refrigerant circulation frequency fo) of the compressor 21 in low-refrigerant-circulation control. Therefore, in oil return control, unlike low-refrigerant-circulation control, there is a risk that the state of refrigerant drift in the outdoor heat exchanger 23 will not change readily and that the effect of resolving refrigerating oil accumulation in the heat transfer tubes 231 will not be as expected. Therefore, low-refrigerant-circulation control described above is needed.

<Steps ST4 to ST6>

In low-refrigerant-circulation control of steps ST2 and ST3 described above, due to the decrease in the operating capacity of the compressor 21, the high pressure Pc of the refrigeration cycle (i.e., the condensation temperature of refrigerant in the indoor heat exchanger 41) in the refrigerant circuit 10 decreases readily, the temperature of air supplied through the indoor heat exchanger 41 into the room tends to decrease, and there is a risk that the level of comfort in the room will be compromised.

In view of this, the controller S in this case determines whether or not the pressure Pc of the refrigeration cycle in the refrigerant circuit 10 has fallen below a predetermined high pressure Pcs at intervals of a predetermined time tf during low-refrigerant-circulation control (i.e., until the low refrigerant circulation time to elapses in step ST3), and the controller lowers the airflow volume of the indoor fan 42 when the high pressure Pc of the refrigeration cycle has fallen below the predetermined high pressure Pcs.

The high pressure Pc of the refrigeration cycle is a pressure value obtained by converting either the pressure Pd detected by the discharge pressure sensor 45 or the temperature Trr detected by the indoor heat exchange temperature sensor 48 to a refrigerant saturation pressure. The predetermined high pressure Pcs is also set to a pressure value such that a comfort level in the room can be ensured. The airflow volume of the indoor fan 42 decreases in increments, sequentially through a high airflow volume H, a medium airflow volume M, a low airflow volume L, and a lowest airflow volume LL.

The decrease in the high pressure Pc of the refrigeration cycle (i.e., the condensation temperature of refrigerant in the indoor heat exchanger 41 in the refrigerant circuit 10 can thereby be suppressed during low-refrigerant-circulation control in steps ST2 and ST3, and refrigerating oil accumulation during the air-warming operation in the heat transfer tubes 231 constituting the outdoor heat exchanger 23 can therefore be resolved while the comfort level in the room is ensured. Moreover, because the airflow volume of the indoor fan 42 is lowered when the high pressure Pc in the refrigerant circuit 10 has fallen below the predetermined high pressure Pcs as is the case in step ST5, the comfort level in the room can be ensured while lowering the airflow volume of the indoor fan 42 as little as possible during low-refrigerant-circulation control, as shown in FIG. 7.

(4) Modifications

<A>

Figure 8:
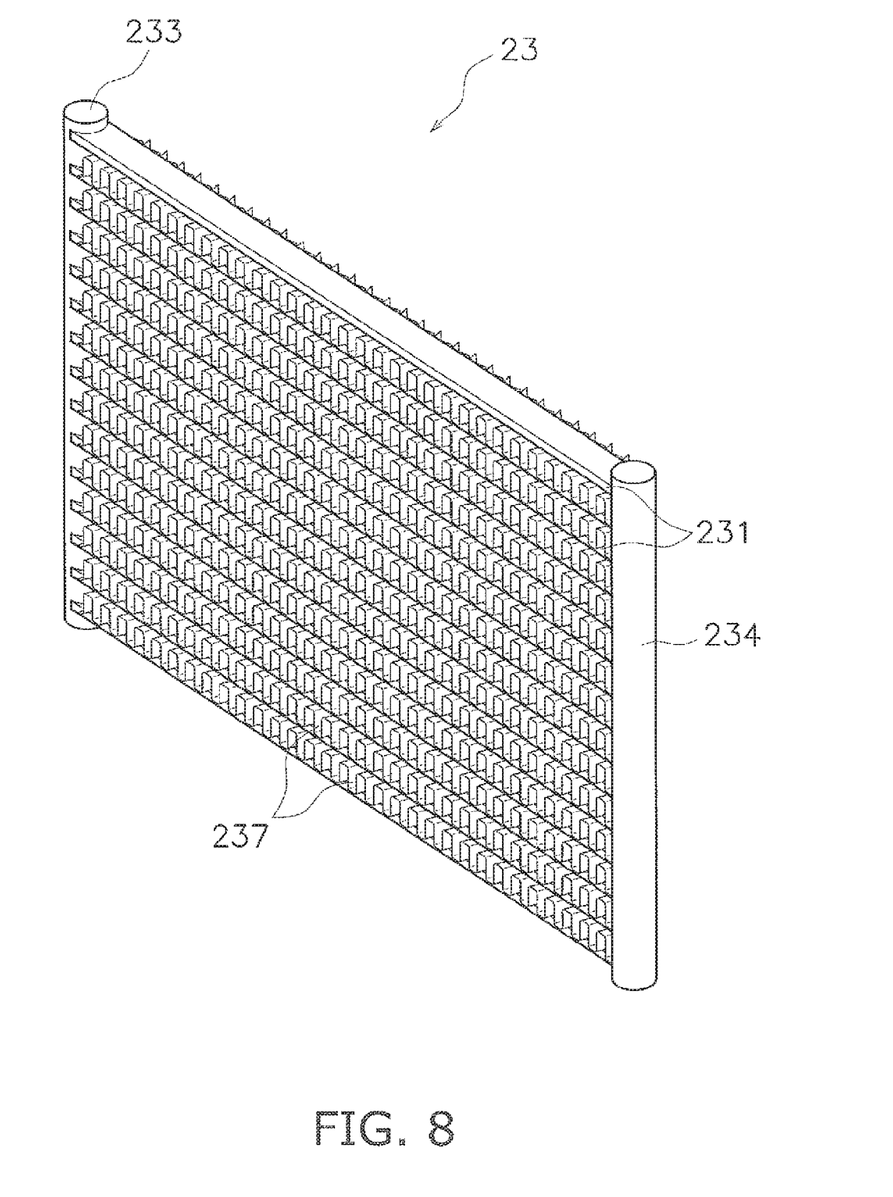
FIG. 8 is a schematic perspective view of an outdoor heat exchanger in a modification.

In the above embodiment, the outdoor heat exchanger 23 is an inserted-fin-type stacked heat exchanger configured primarily from a plurality of heat transfer tubes 231 composed of flat perforated tubes, and numerous inserted fins 232 (see FIGS. 2 to 4), but is not limited as such. For example, the outdoor heat exchanger 23 may be a corrugated-fin-type stacked heat exchanger configured primarily from a plurality of heat transfer tubes 231 composed of flat perforated tubes, and numerous corrugated fins 237, as shown in FIG. 8. The corrugated fins 237 are fins made of aluminum or an aluminum alloy bent into corrugations. The corrugated fins 237 are disposed in ventilation spaces enclosed between vertically adjacent heat transfer tubes 231, and the dips and crests of the fins are in contact with the flat-surface parts of the heat transfer tubes 231. In this case as well, refrigerating oil accumulation in the heat transfer tubes 231 constituting the outdoor heat exchanger 23 can be resolved by performing the same low-refrigerant-circulation control as in the above embodiment. In other words, the outdoor heat exchanger 23 is not limited to the heat exchanger shown in FIGS. 2 to 4 and FIG. 8 as long as it is a heat exchanger that uses a plurality of heat transfer tubes composed of flat perforated tubes.

<B>

In the above embodiment, the criterion for initiating the operation of defrosting the outdoor heat exchanger 23 is used as the oil-accumulation-resolving criterion, which is the criterion for performing low-refrigerant-circulation control; however, no limitation is provided thereby. Also in the above embodiment, the operation of defrosting the outdoor heat exchanger 23 is a reverse-cycle defrosting operation in which refrigerant is made to circulate in the same direction as in the air-cooling operation, but this defrosting operation is not provided by way of limitation.

<C>

In the above embodiment, when the outdoor heat exchanger 23 is a heat exchanger that uses a plurality of heat transfer tubes 231 composed of flat perforated tubes, the above-described low-refrigerant-circulation control is performed to address refrigerating oil accumulation caused by the air-warming operation in the outdoor heat exchanger 23; however, no limitation is provided thereby.

For example, when the indoor heat exchanger 41 is a heat exchanger that uses a plurality of heat transfer tubes 231 composed of flat perforated tubes (not shown), there is a risk that refrigerating oil will accumulate in the indoor heat exchanger 41 when the air-cooling operation is performed for a long period of time. Particularly in cases such as when the indoor unit 4 is a floor-standing unit, the indoor heat exchanger 41 tends to be tall and refrigerating oil accumulates readily, similar to the outdoor heat exchanger 23 (see FIGS. 2 to 4 and FIG. 8) of the above embodiment.

As a countermeasure to this, low-refrigerant-circulation control, in which refrigerant is made to circulate sequentially through the compressor 21, the outdoor heat exchanger 23, the expansion valve 24, and the indoor heat exchanger 41, may be performed for a predetermined time to with the operating capacity of the compressor 21 having been lowered to a predetermined capacity (e.g., the low refrigerant circulation frequency fo), similar to the above embodiment (see FIGS. 6 and 7). The oil-accumulation-resolving criterion in this case could be the criterion for performing oil return control. Specifically, refrigerating oil accumulation in the heat transfer tubes 231 which might have been unresolvable with oil return control is resolved in advance when oil return control is performed during the air-cooling operation.

In this case, refrigerant circulates within the refrigerant circuit 10 in the same direction as the air-cooling operation during low-refrigerant-circulation control, but due to the decrease in the operating capacity of the compressor 21, the state of refrigerant drift within the indoor heat exchanger 41 changes, and the refrigerant flow rate tends to increase in the heat transfer tubes 231 where refrigerating oil has accumulated. Refrigerating oil accumulated in the heat transfer tubes 231 is thereby expelled by the flow of refrigerant, and refrigerating oil accumulation in the heat transfer tubes 231 can be resolved.

INDUSTRIAL APPLICABILITY

The present invention is widely applicable in air conditioning apparatuses which have an outdoor heat exchanger or an indoor heat exchanger composed of a heat exchanger in which flat perforated tubes are used as heat transfer tubes.

What is claimed is:

1. An air conditioning apparatus comprising:
a refrigerant circuit configured by connecting a compressor, an outdoor heat exchanger, an expansion valve, and an indoor heat exchanger, the air conditioning apparatus performing an air-warming operation in order to warm air in a room by circulating refrigerant through the compressor, the indoor heat exchanger, the expansion valve, and the outdoor heat exchanger in order;
an indoor fan arranged to supply indoor air to the indoor heat exchanger; and
a controller operatively connected to the refrigerant circuit and the indoor fan,
the outdoor heat exchanger being a heat exchanger in which heat transfer tubes including flat perforated tubes arrayed vertically in multiple levels are used,
the heat transfer tubes being sectioned into main heat exchange parts constituting a top part of the outdoor heat exchanger and subordinate heat exchange parts constituting a bottom part of the outdoor heat exchanger,
an upper exit-entry space for gas refrigerant corresponding to the main heat exchange parts and a lower exit-entry space for liquid refrigerant corresponding to the subordinate heat exchange parts being formed in the outdoor heat exchanger, the controller being programmed to execute a low-refrigerant-circulation control for a predetermined time when an oil-accumulation-resolving criterion is met during the air-warming operation, the low-refrigerant-circulation control being a control in which the refrigerant is circulated through the compressor, the indoor heat exchanger, the expansion valve, and the outdoor heat exchanger in order with an operating capacity of the compressor having been lowered by the controller to a predetermined capacity and with an airflow volume of the indoor fan having been reduced by the control ler, the oil-accumulation resolving criterion being used to initiate an operation of defrosting the outdoor heat exchanger, and the low-refrigerant-circulation control being performed before the operation of defrosting the outdoor heat exchanger is performed.

2. The air conditioning apparatus according to claim 1, wherein the airflow volume of the indoor fan is reduced by the controller when a high pressure in the refrigerant circuit falls below a predetermined high pressure.

3. An air conditioning apparatus comprising:

a refrigerant circuit configured by connecting a compressor, an outdoor heat exchanger, an expansion valve, and an indoor heat exchanger, the air conditioning apparatus performing an air-warming operation in order to warm air in a room by circulating refrigerant through the compressor, the outdoor heat exchanger further including a first header collecting pipe and a second header collecting pipe, the outdoor heat exchanger being a heat exchanger in which heat transfer tubes including flat perforated tubes arrayed vertically in multiple levels are used, the heat transfer tubes being sectioned into main heat exchange parts constituting a top part of the outdoor heat exchanger and subordinate heat exchange parts constituting a bottom part of the outdoor heat exchanger, the heat transfer tubes being disposed between the first header collecting pipe and the second header collecting pipe with opposite ends of the heat transfer tubes being connected to the first header collecting pipe and the second header collecting pipe, respectively, an upper exit-entry space for gas refrigerant corresponding to the main heat exchange parts and a lower exit-entry space for liquid refrigerant corresponding to the subordinate heat exchange parts being formed in the outdoor heat exchanger, when an oil-accumulation-resolving criterion is met during the air-warming operation, a low-refrigerant-circulation control being executed for a predetermined time, the low-refrigerant-circulation control being a control in which the refrigerant is circulated through the compressor, the indoor heat exchanger, the expansion valve, and the outdoor heat exchanger in order with an operating capacity of the compressor having been lowered to a predetermined capacity, the oil-accumulation resolving criterion being used to initiate an operation of defrosting the outdoor heat exchanger, and the low-refrigerant-circulation control being performed before the operation of defrosting the outdoor heat exchanger is performed, the upper exit-entry space and the lower exit-entry space are formed in the first header collecting pipe by partitioning an internal space thereof, and upper turn-back spaces corresponding to the main heat exchange parts and lower turn-back spaces corresponding to the subordinate heat exchange parts are formed in the second header collection pipe by partitioning an internal space of the second header collecting pipe, the partitioning of the internal space of the second header collection pipe being configured such that a single shared turn-back space is formed between the upper turn-back spaces and the lower turn-back spaces, the single shared turn-back space corresponding to the one of the main heat exchange parts and the one of the subordinate heat exchange parts that are vertically adjacent to each other, and each of the upper turn-back spaces being connected to one of the lower turn-back spaces via a communication.

4. The air conditioning apparatus according to claim 3, further comprising an indoor fan, an airflow volume of the indoor fan being reduced during the low-refrigerant-circulation control.

5. The air conditioning apparatus according to claim 4, wherein the airflow volume of the indoor fan is reduced when a high pressure in the refrigerant circuit falls below a predetermined high pressure.

* * * * *